(12) United States Patent
Fecamp et al.

(10) Patent No.: US 7,832,210 B2
(45) Date of Patent: Nov. 16, 2010

(54) SYSTEM FOR CONTROLLING AND OPTIMIZING THE EMISSION OF A CATALYTIC COMBUSTOR IN A SINGLE-SHAFT GAS TURBINE

(75) Inventors: Benoit Fecamp, Florence (IT); Ever Avriel Fadlun, Rome (IT); Stefano Groppi, Pistoia (IT)

(73) Assignee: Nuovo Pignone Holdings S.p.A., Florence (IT)

( * ) Notice: Subject to any disclaimer, the term of this patent is extended or adjusted under 35 U.S.C. 154(b) by 987 days.

(21) Appl. No.: 10/540,373

(22) PCT Filed: Dec. 12, 2003

(86) PCT No.: PCT/EP03/14563

§ 371 (c)(1),
(2), (4) Date: Apr. 24, 2006

(87) PCT Pub. No.: WO2004/057171

PCT Pub. Date: Jul. 8, 2004

(65) Prior Publication Data

US 2006/0220472 A1 Oct. 5, 2006

(30) Foreign Application Priority Data

Dec. 23, 2002 (IT) .......................... MI2002A2757

(51) Int. Cl.
*F02C 1/00* (2006.01)

(52) U.S. Cl. .......................................... 60/723; 60/777

(58) Field of Classification Search ................... 60/723, 60/785, 795, 777; 700/7, 9; 701/100
See application file for complete search history.

(56) References Cited

U.S. PATENT DOCUMENTS

| 3,737,246 | A | * | 6/1973 | Shirato et al. | .................. 415/1 |
| 4,733,527 | A | | 3/1988 | Kidd | |
| 4,809,497 | A | * | 3/1989 | Schuh | ...................... 60/39.27 |
| 5,168,447 | A | | 12/1992 | Moore | |
| 5,174,105 | A | | 12/1992 | Hines | |

(Continued)

FOREIGN PATENT DOCUMENTS

DE 10134612 A 9/2002

(Continued)

OTHER PUBLICATIONS

Chinese Office Action for Appln No. 200380106609.7 (3 pages).

(Continued)

*Primary Examiner*—Michael Cuff
*Assistant Examiner*—Phutthiwat Wongwian
(74) *Attorney, Agent, or Firm*—Potomac Patent Group PLLC

(57) ABSTRACT

System for controlling and optimizing the emissions of a catalytic combustor in a single-shaft gas turbine (10), comprising at least one calculation unit for implementing a mathematical model of the operation of the said gas turbine (10), on the basis of a set of predetermined parameters, by means of which the aforesaid emissions can be optimized during variations of the operating conditions of the turbine over a range of external environmental conditions from approximately −29° C. to +49° C.

8 Claims, 4 Drawing Sheets

U.S. PATENT DOCUMENTS

| | | | | |
|---|---|---|---|---|
| 6,095,793 | A * | 8/2000 | Greeb | 431/12 |
| 6,170,251 | B1 * | 1/2001 | Skowronski et al. | 60/783 |
| 6,364,602 | B1 | 4/2002 | Cotroneo et al. | |
| 6,584,775 | B1 * | 7/2003 | Schneider et al. | 60/775 |
| 2001/0022078 | A1 * | 9/2001 | Horii et al. | 60/39.182 |
| 2002/0029557 | A1 | 3/2002 | Tobo et al. | |
| 2002/0083715 | A1 | 7/2002 | Dalla Betta et al. | |
| 2004/0255595 | A1 * | 12/2004 | Morgan et al. | 60/773 |

FOREIGN PATENT DOCUMENTS

| | | |
|---|---|---|
| JP | 05026057 A | 2/1993 |

OTHER PUBLICATIONS

International Search Report for PCT/EP03/14563 mailed May 11, 2004.

* cited by examiner

SYSTEM FOR CONTROLLING AND OPTIMIZING THE EMISSION OF A CATALYTIC COMBUSTOR IN A SINGLE-SHAFT GAS TURBINE

CROSS-REFERENCE TO RELATED APPLICATIONS

This application is a National Phase Application of International Application No. PCT/EP2003/014563, filed Dec. 12, 2003, which claims the priority of Italian Patent Application No. MI2002A002757, filed Dec. 23, 2002. The present application claims priority from both applications.

BACKGROUND OF THE INVENTION

Field of the Invention

The present invention relates to a system for controlling and optimizing the emissions of a catalytic combustor in a single-shaft gas turbine.

DESCRIPTION OF THE BACKGROUND

A gas turbine is defined as a rotating thermal machine assembly which converts the enthalpy of a gas to useful work, using gas obtained directly from a combustion process, and supplying mechanical power on a rotating shaft.

A turbine therefore usually comprises a compressor, most commonly of the axial type, outside a combustion chamber and a turbine (turboexpander) which, in a single-shaft gas turbine, supplies both energy for moving the compressor and power to the user.

The turboexpander, the compressor, the combustion chamber, the mechanical energy output shaft, the control system and the starting system form the essential parts of a gas turbine.

As regards the operation of a gas turbine, it is known that the fluid passes into the compressor at low pressure and at low temperature; in flowing through the compressor, the gas is compressed and its temperature rises.

The gas then enters the combustion chamber, where it undergoes a further significant temperature increase. Thus the enthalpy of the gas can be exploited to obtain useful work; this is because the work given up by the gas to the turbine is greater than that absorbed by the compressor, and therefore a certain amount of energy remains available on the shaft of the machine, and this energy, after subtraction of the work absorbed by the accessories and by the passive resistance of the moving mechanical members, constitutes the useful work of the system.

At the outlet of the combustion chamber, therefore, the gas, at high pressure and high temperature, passes through suitable pipes and reaches the turbine, where it gives up some of the energy accumulated in the compressor and in the combustion chamber and then flows to the outside through the exhaust pipes.

In the last few decades, the problem of environmental pollution has led to the introduction of various laws designed to regulate the emission of pollutants to the atmosphere, in an attempt to make air quality acceptable.

Consequently, national and international standards require the use of methods and equipment for reducing the pollutants present in gases, these methods and equipment being suitably designed according to the chemical and physical properties of the gases.

In general, the emissions of gas turbines comprise various chemical species which have been fully oxidized or which do not tend to react, principally $CO_2$, $H_2O$, $N_2$ and $O_2$; species with a low level of oxidation, such as CO, unburnt hydrocarbons, particulates, and mixtures of nitrogen and sulphur oxides denoted $NO_x$ and $SO_x$ respectively, are also present in the emissions as pollutants in concentrations of the order of parts per million (ppm).

As regards the fully oxidized species and nitrogen, the content of these in emissions can be calculated provided that the composition of the fuel used and the operating conditions of the machine are known.

As regards the other pollutants, however, it is practically impossible to evaluate their concentration, except in the case of total sulphur oxides.

Therefore, in order to determine the values of these pollutants (CO, unburnt hydrocarbons, particulates, $SO_x$ and $NO_x$) it is necessary to make accurate measurements and conduct theoretical analyses.

Unburnt hydrocarbons are generally present as a result of inefficient combustion which does not fully oxidize the combustible species present, but their presence is limited to a few ppm and therefore does not constitute a significant pollution problem.

As regards the sulphur oxides, these consist of a mixture, in variable proportions, of $SO_2$ and $SO_3$ which combine with water vapour to form the corresponding acids.

Sulphur oxides are practically absent from combustion fumes caused by burning natural gas, and as a general rule their formation is prevented by selecting the fuels, opting for those with a very low sulphur content.

For nitrogen oxides ($NO_x$) and carbon monoxide (CO), the picture is much more complicated; in order to control these substances, particular attention must be paid to the gas combustion temperature.

For example, in the case of nitrogen oxides (generally denoted $NO_x$), their presence in emissions decreases rapidly as the combustion temperature is reduced.

Conventional technologies for reducing these pollutants, such as water and water vapour injection, cannot achieve the extremely low emission levels required by the law in force in many areas.

$NO_x$ is produced in three main ways during the combustion process:

by reaction with $N_2$ in combustion with oxygen at high temperatures;

from the nitrogen present in fuels;

by the reaction of the radical derivatives of fuels, such as $N_2$ converted to NO.

The formation mechanism must be known to enable the $NO_x$ emission to be controlled efficiently.

The simplest and most widely used model of $NO_x$ formation is that discovered by Zeldovich, which uses the following reactions:

$$N_2 + O \rightarrow NO + N$$

$$O_2 + N \rightarrow NO + O$$

$$OH + N \rightarrow NO + H$$

These reactions are independent of the type of combustion used for the reaction, since they take place at the high temperatures developed by the reagents themselves.

The formation of $NO_x$ can be controlled by modifying the operating conditions during the combustion process.

For example, the quantity of oxygen present can be reduced to minimize the formation of $NO_x$. In practical terms, a small quantity of air is used; the introduction of water into furnaces reduces the temperature as a result of the energy jump caused by the latent heat of the water.

A reduction technology used at present is selective catalytic reduction (SCR), in which ammonia is used together with the catalytic process.

The ammonia is injected with the burnt gases into the catalysis bed. The nitrogen oxides $NO_x$ are combined with the ammonia on the surface of the catalyst and are dissolved in water and nitrogen.

This system has proved to be advantageous for eliminating $NO_x$, but its costs are high.

A different approach to nitrogen oxide reduction makes use of a catalytic post-combustion process, with a platinum catalyst and a nitrogen oxide removal agent consisting of potassium carbonate.

Both of the aforesaid technologies, although of proven validity in terms of the reduction of nitrogen oxide concentration achieved, are of little practical use because of the significant loss of efficiency which they cause in the turbine.

Furthermore, all the technologies used up to the present time are highly sensitive to the variation of operating conditions, particularly the ambient temperature and the required load.

Combustion by means of a catalytic combustion chamber resolves the problems of cost and complexity inherent in the solutions described above for reducing pollutants ($NO_x$ and CO).

The object of the present invention is to provide a system for controlling and optimizing the emissions of a catalytic combustor, which makes it possible to reduce the concentration of pollutants such as nitrogen oxides ($NO_x$) and carbon monoxide to values close to zero ppm over a wide operating range of a gas turbine. Another significant object of the invention is to provide a system for controlling and optimizing the emissions of a catalytic combustor in a gas turbine which can be implemented with production and maintenance costs which are relatively low in view of the advantages obtained.

BRIEF SUMMARY OF THE EMBODIMENTS

These and other objects of the present invention are achieved by providing a system for controlling and optimizing the emissions of a gas turbine of the type comprising a catalytic combustor, and comprising at least one calculation unit for implementing a mathematical model of the operation of the said gas turbine, on the basis of a set of predetermined parameters, by means of which the aforesaid emissions can be optimized during variations of the operating conditions of the turbine over a wide range of external environmental conditions, as disclosed in claim 1.

Further detailed technical characteristics are specified in the subsequent claims.

In particular, the control system according to the present invention makes it possible to limit the incidence of the phenomenon in which, during load variations, there is an abrupt rise in the flame temperature in the precombustor and a consequent concentration of pollutants such as nitrogen oxides well above the permitted limit values.

BRIEF DESCRIPTION OF THE DRAWINGS

The characteristics and advantages of a system for controlling and optimizing the emissions of a catalytic combustor in a gas turbine according to the present invention will be made clearer by the following description, provided by way of example and without restrictive intent, which refers to the attached schematic drawings in which.

DETAILED DESCRIPTION OF THE EMBODIMENTS

Figure 1:
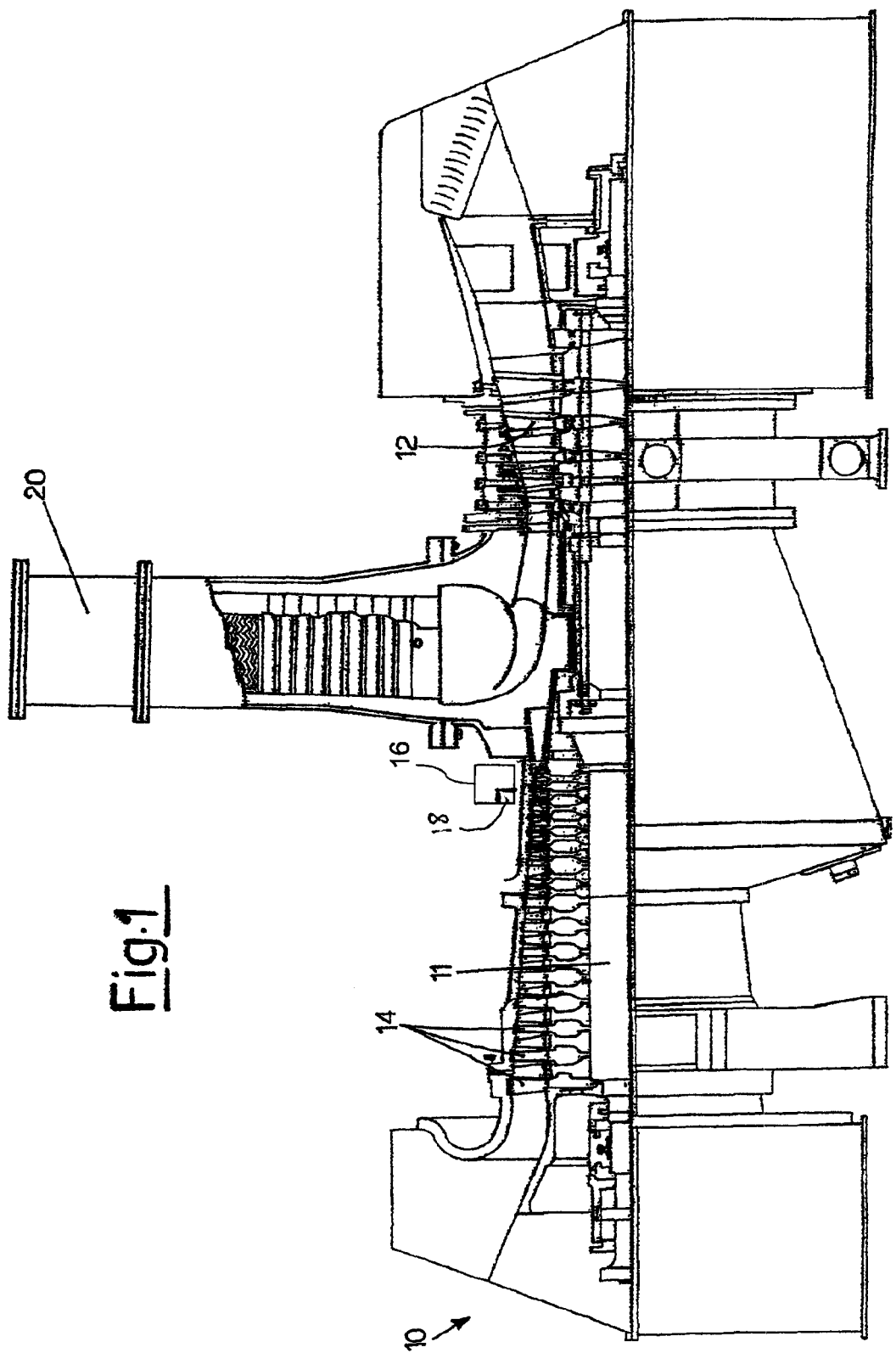
FIG. 1 is a schematic lateral view of a gas turbine according to the invention.

With particular reference to FIG. 1, a gas turbine 10 essentially comprises an axial compressor 11, a combustor 20, and a turbine 12.

In the illustrated example, the combustor 20 has a head, immediately downstream of which there is a first combustion region followed by a catalytic cell and a post-combustion region.

This combustor 20 is designed to be supplied with gas fuels.

An array of adjustable vanes 14, also known by the acronym IGV ("Inlet Guide Vanes"), can be seen at the inlet of the compressor 11.

The adjustable vanes (IGV) can be adjusted and/or rotated in order to set them at an appropriate angle to the direction of the air entering the compressor, in such a way as to vary the flow rate at the turbine inlet.

To control the adjustable vanes (IGV), the positions of the vanes 14 of the distributors must be made dependent on the adjustment of the turbine exhaust gas temperature, the turbine speed, the compressor exhaust pressure and the air temperature at the turbine inlet, in such a way as to keep the turbine operating conditions within an operating region A in which the concentrations of carbon monoxide and unburnt substances in the exhaust gases are minimized in all technologically possible operating conditions in a range of ambient temperatures varying from approximately −29° C. to +49° C. and over a wide power range.

The control system for the adjustable vanes (IGV) described above is associated with a system 16 for bleeding hot air from the compressor exhaust (known as and IBH, an acronym for "inlet bleed heating system") for keeping the compressor exhaust, which is introduced into the inlet of the compressor, in standard (ISO) conditions.

The bleed system (IBH) 16 is shown in FIG. 1 and is controlled by programming the opening of the valve 18 in accordance with the angle of rotation of the adjustable vanes (IGV).

The combined effect of the rotation of the adjustable vanes (IGV) and the bleed system (IBH) makes it possible to control the variation of the difference between the gas temperature at the exhaust of the first combustion region (TPBEX) and the compressor exhaust temperature ($T_3$).

This variable is also denoted by the term Trise (Trise=TPBEX−$T_3$).

Trise has to be kept within certain limits, because most of the $NO_x$ is produced in this first combustion region and is a function of the increase in Trise.

TPBEX, and consequently Trise, are also decreasing functions of the adiabatic temperature ($T_{ad}$) at the catalyser outlet from the combustion chamber.

In order to keep TPBEX low (for low $NO_x$ production) it is therefore necessary to maximize $T_{ad}$ (where $T_{ad}$ is defined as the temperature which would be present at the outlet of the combustion chamber if combustion were complete).

The trend of the variation of the adjustable vanes (IGV) with respect to ISO standard conditions is linear, and remains constant up to a certain value of CPR (the compressor pressure ratio, defined as the ratio between the total pressure of the air leaving the compressor and the pressure of the incoming air), and then decreases in a linear way.

Figure 4:
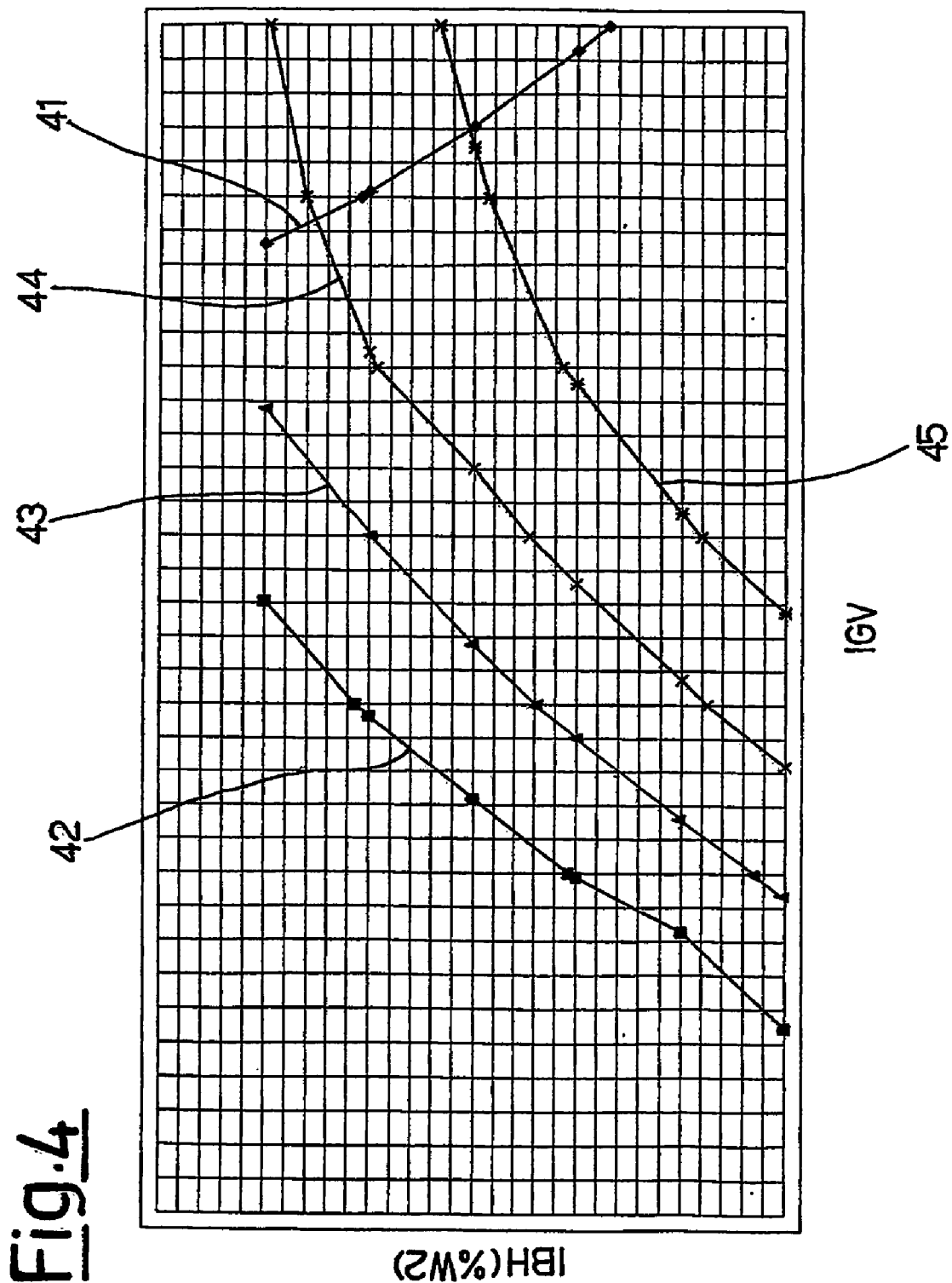

The correlation between the flow rates produced by the bleed system (IBH) and the angular rotation of the adjustable vanes (IGV) to keep $T_3$ constant over a wide ambient temperature range varying from approximately −29° C. to approximately +49° C. is summarized in FIG. 4, which shows the trend of the flow rates of the bleed system (IBH) on the vertical axis as functions of the angle of rotation of the adjustable vanes (IGV) (on the horizontal axis).

The diagram in FIG. 4 shows a set of curves having substantially linear trends, corresponding to the different loads required by the machine, in particular a first curve 41 representing ISO $T_3$, a second curve 42 expressing the trend of the bleed system (IBH) at 50% power, a third curve 43 at 60%, a curve 44 at 70%, and a curve 45 at 80%.

In practice, when increasing or decreasing the supply of fuel, in other words when requesting more or less power, it is necessary to carry out the adjustments while maintaining these relations between the characteristic values of the bleed system (IBH) and the rotation of the adjustable vanes (IGV), in order to keep a constant temperature $T_3$ for a given ambient temperature.

Figure 2:
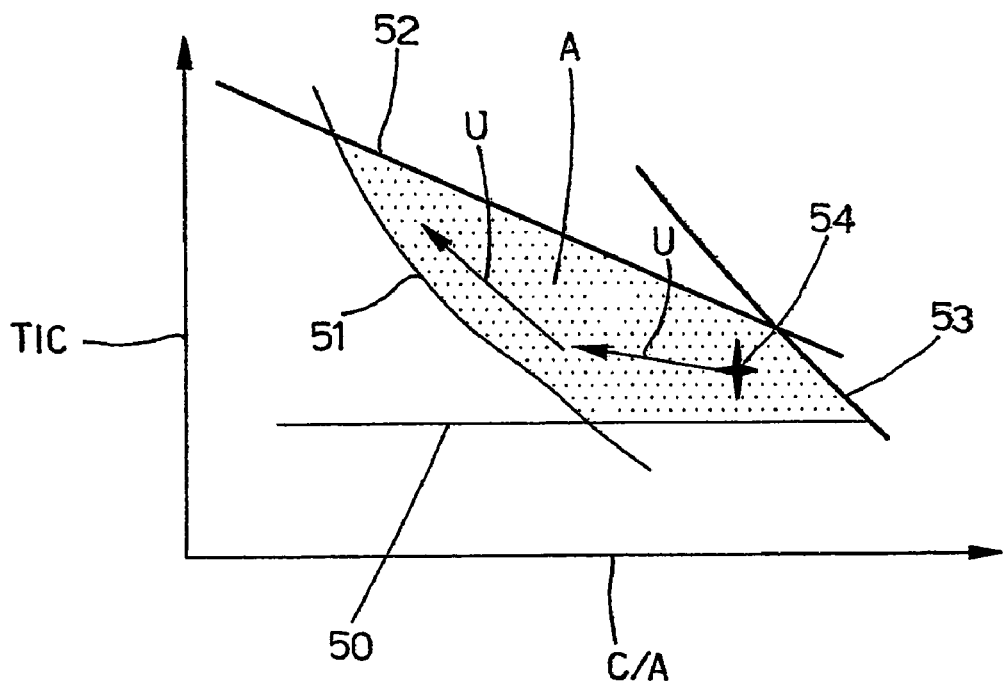
FIGS. 2 to 4 show diagrams representing the control parameters for the operation of the turbine.

With reference to FIG. 2, this shows a diagram in which the inlet temperature of the catalyser TIC is shown on the vertical axis and the fuel-air composition ratio F/A is shown on the horizontal axis.

The operating region A in which it is necessary to act in order to optimize the reduction of the concentrations of nitrogen oxides, carbon oxide and unburnt hydrocarbons in the emissions is delimited by a lower line 50 which defines the catalyst activation temperature, a curve 51 positioned towards what are known as lean mixtures, in other words those with a low fuel value, representing the limit for the production of carbon monoxide at the various temperatures, and a pair of upper curves 52 and 53 which represent the limit temperatures for the catalyst, the first upper curve 52 relating to lean mixtures and the second curve 53 relating to rich mixtures, in other words those with a high fuel content.

Within the region A the number 54 indicates the recommended optimal starting point for the operations, while the arrows U indicate the path to be followed when the power of the gas turbine is to be reduced, in other words when less fuel is introduced.

Figure 3:
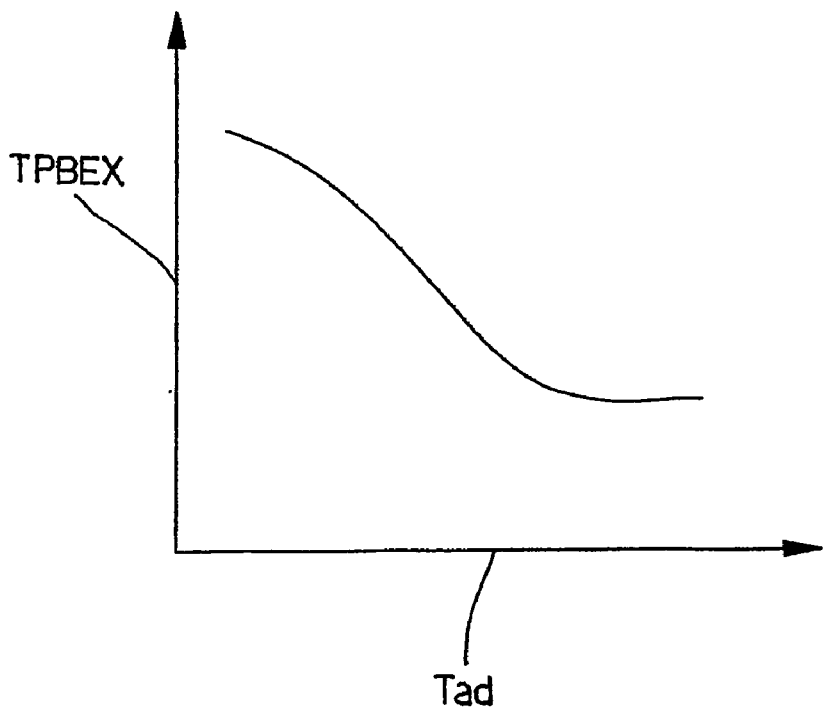

FIG. 3 illustrates the principle expressed above in a different context, in other words as a correlation of the trend of TPBEX (vertical axis) as a function of the temperature of the catalyst Tad (horizontal axis).

Thus, when the load of the gas turbine with a catalytic combustion chamber is reduced (so that $T_{ad}$ falls), the temperature TPBEX must be increased to maintain the correct operation of the catalyst.

As stated previously, the emission of nitrogen oxide is an increasing function of Trise (TPBEX and $T_3$), and therefore, when the load is reduced, it is necessary to compensate for the normal lowering of $T_3$ and the increase in the TPBEX requirement, as the latter effect would cause an excessive increase in $NO_x$.

In practical terms, if the emissions are to be optimized the machine must operate in the conditions defined by the curve, and the bleed system (IBH) must be operated at all times so that this curve is followed.

The operating procedures are constrained by the ranges of values within which the machine operates, namely a rotation of the adjustable vanes (IGV) between 0 and −50 degrees, and a flow rate of between 0 and 5% of W2 for the bleed system (IBH), where W2 denotes the flow rate of the air drawn in by the compressor.

The required results are a power level meeting ISO standards, a reduction of $NO_x$ from 50% to 100% from −29° C. to 49° C., and a reduction of carbon monoxide, CO, from 50% to 100% from −29° C. to 49° C.

The adjustments made possible by the invention enable the maximum standard flow rate according to ISO standards to be modified by a rotation of the adjustable vanes (IGV) equal to 0, while the flow rate of the bleed system (IBH) varies from 0 to 100% of load according to ISO standards.

Figure 5:
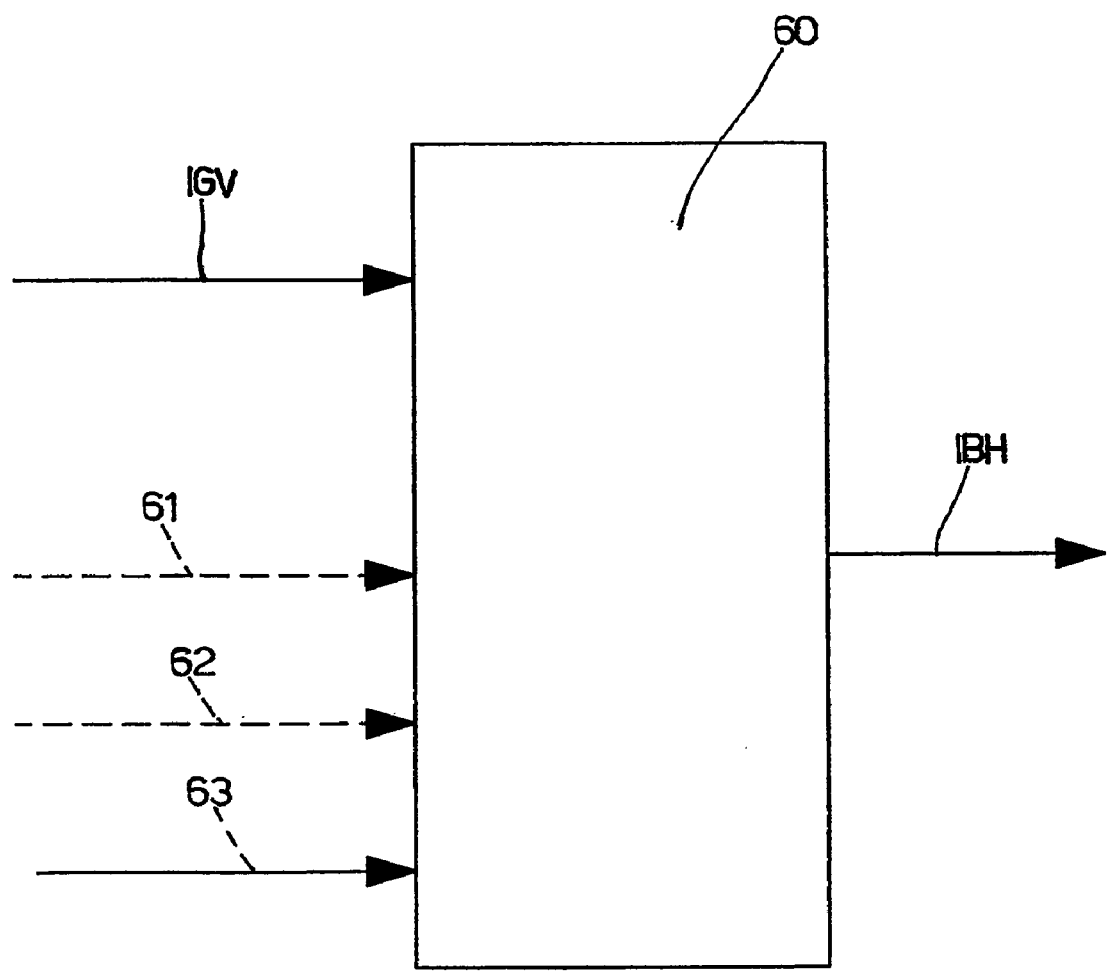
FIG. 5 is a block diagram illustrating a detail of the operation of the system according to the invention.

With reference to the diagram of FIG. 5, a mathematical model of the operation of the said gas turbine 10 is implemented in the calculation unit 60, on the basis of a set of predetermined parameters and as a function of data measured in the gas turbine, in such a way as to optimize the aforesaid emissions during variations of the operating conditions of the turbine over a range of external environmental conditions extending from approximately −29° C. to +49° C.

In practice, the parameter on which the calculation unit 60 operates is the adjustment of the extraction flow rate of the bleed system (IBH), based on the measurement of the angle of rotation of the distributor vanes (IGV) 14 and the ambient temperature 63.

For greater accuracy, the calculation unit 60 will also be designed to allow for the compressor inlet pressure 61 and the absolute humidity at the compressor inlet 62.

Thus the implementation of the control system as described makes it possible to obtain an excellent result in terms of optimal control, good performance being established by maintaining the flame temperature in the precombustor below the specified limits and thus below the pollutant emission level, in both transient and regular operating conditions, as predicted by simulations which have been conducted.

The above description clearly demonstrates the characteristics of the system for controlling and optimizing the emissions of a catalytic combustor in a single-shaft gas turbine, which forms the object of the present invention, and also makes clear the advantages of the system, which include:

reduced levels of polluting emissions;
reduced pressure oscillations in the combustion chamber and good flame stability;
high combustion efficiency;
simple and reliable operation;
relatively low production and maintenance costs by comparison with the prior art;
a calculated flame temperature in the precombustor held below predetermined limit values.

The invention claimed is:

1. A gas turbine system for controlling and optimizing emissions of a catalytic combustor, the gas turbine comprising:

a compressor, the catalytic combustor and a turbine;
at least one calculation unit configured to implement a mathematical model of an operation of the gas turbine,
wherein the mathematical model links a flow rate of a bleed system of the compressor to (i) an ambient temperature and (ii) a rotation of adjustable vanes that control a fluid entering the compressor, and
the at least one calculation unit adjusts the flow rate of the bleed system of the compressor, using a valve, based on the ambient temperature and the rotation of the adjustable vanes of the compressor such that the emissions are optimized during variations of operating conditions of the turbine over a range of external environmental conditions from approximately −29° C. to +49° C.

2. The system according to claim 1, wherein the at least one calculation unit further uses a compressor inlet pressure and an absolute humidity at the compressor inlet to adjust the flow rate of the bleed system, in order to provide greater accuracy.

3. The system according to claim 1, wherein the at least one calculation unit uses values in the range from 0 to −50 degrees for the rotation of the adjustable vanes and in the range from 0 to 5% of the flow rate (W2) for the bleed system, where W2 is the flow rate of air drawn in by the compressor.

4. The system of claim 1, further comprising:
the compressor configured to drawn a fluid at the predetermined flow rate W2;
the catalytic combustor connected to an outlet of the compressor and including a combustion region, a catalytic cell and a post-combustion region, wherein the combustion region is configured to mix and burn a compressed fluid flow from an exhaust of the compressor with a fuel flow; and
the turbine connected to the post-combustion region and configured to transform an enthalpy of the burned mixed of fluid from the compressor and the fuel flow into mechanical energy.

5. The system of claim 4, further comprising:
the adjustable vanes provided at an inlet of the compressor and configured to rotate to adjust a fluid flow entering the compressor.

6. The system of claim 5, further comprising:
the bleed system provided at an outlet of the compressor and configured to remove part of the fluid flow passing through the compressor.

7. The system of claim 6, wherein the removed part of the fluid flow passing through the compressor is returned to an inlet of the compressor.

8. The system of claim 1, wherein the at least one calculation unit adjusts the flow rate of the bleed system such that a temperature (T3) at the compressor exhaust is maintained constant over the ambient temperature varying from approximately −29° C. to +49° C.

* * * * *